(12) United States Patent
Marcellin-Dibon

(10) Patent No.: US 6,404,551 B2
(45) Date of Patent: *Jun. 11, 2002

(54) MULTIMIRROR DEVICE FOR ROTATING THE POLARIZATION OF AN ELECTROMAGNETIC SIGNAL

(75) Inventor: Eric Marcellin-Dibon, Thames Ditton (GB)

(73) Assignee: Thomason Licensing S.A., Boulgne Cedex (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,317

(22) Filed: Nov. 6, 1998

(30) Foreign Application Priority Data

Nov. 18, 1997 (FR) .......................... 97 14440

(51) Int. Cl.⁷ .............................. G02B 5/30; G02B 27/28
(52) U.S. Cl. ................... 359/487; 359/495; 359/496; 359/627; 359/633; 359/638; 359/834
(58) Field of Search .................... 359/485, 487, 359/488, 495, 496, 834, 835, 836, 627, 633, 638

(56) References Cited

U.S. PATENT DOCUMENTS

| | | | | |
|---|---|---|---|---|
| 4,252,410 A | * | 2/1981 | Jain | 359/487 |
| 4,525,034 A | * | 6/1985 | Simmons | 359/488 |
| 4,787,710 A | * | 11/1988 | Durell | 359/487 |
| 4,822,150 A | * | 4/1989 | Duarte | 359/487 |
| 5,048,926 A | * | 9/1991 | Tanimoto | 359/487 |
| 5,233,460 A | * | 8/1993 | Partlo et al. | 359/487 |
| 5,684,630 A | | 11/1997 | Arai | 359/487 |
| 5,751,482 A | * | 5/1998 | Challener, IV | 359/487 |
| 5,777,788 A | * | 7/1998 | Noguchi | 359/487 |
| 5,790,233 A | * | 8/1998 | Ulbers et al. | |
| 5,847,871 A | * | 12/1998 | Sumida et al. | 359/487 |
| 5,898,521 A | * | 4/1999 | Okada | 359/487 |
| 5,982,540 A | * | 11/1999 | Koike et al. | 359/487 |
| 6,017,125 A | * | 1/2000 | Vann | |

FOREIGN PATENT DOCUMENTS

| | | | |
|---|---|---|---|
| EP | 0 457 605 A2 | 11/1991 | G02B/27/28 |
| EP | 0 545 389 A1 | 6/1993 | G02B/27/28 |
| EP | 0 676 651 A1 | 10/1995 | G02B/5/04 |

OTHER PUBLICATIONS

Johnston; "Broadband Polarization Rotator for the Infrared"; Applied Optics; vol. 16; No. 4; Apr. 1977; pp. 1082–1084.*

Preliminary Search Report for counterpart French patent application 97 14440, filed on Nov. 18, 1997.

* cited by examiner

Primary Examiner—Ricky D. Shafer
(74) Attorney, Agent, or Firm—J. S. Tripoli; H. D. Fried; J. J. Kolodka

(57) ABSTRACT

The invention relates to a multimirror device for rotating the polarization of an electromagnetic signal, especially a light signal, through 90°, the output ray having approximately the same direction as the input ray. This device comprises at least one combination (40) of three mirrors (42, 44, 46) which are arranged in such a way that a ray entering one of the mirrors at an angle of incidence of 45° is reflected at the same angle off the other mirrors, the polarization vector (V) of the incident ray being presented in such a way with respect to the mirrors that a reflection off one of the three mirrors changes the direction of polarization while the reflections off the other two mirrors does not change this direction of polarization. Preferably, a plurality of multiple-mirror combinations (40, 40', 40") is provided on a sheet, each combination forming a pattern which is repeated regularly, the patterns all having identical shapes and sizes.

12 Claims, 2 Drawing Sheets

MULTIMIRROR DEVICE FOR ROTATING THE POLARIZATION OF AN ELECTROMAGNETIC SIGNAL

FIELD OF THE INVENTION

The invention relates to a multimirror device for rotating the polarization of an electromagnetic wave, especially a light wave. It also relates to the application of such a device to an image-projection apparatus of the liquid-crystal type.

BACKGROUND OF THE INVENTION

In many technologies it is necessary to rotate the polarization of an electromagnetic wave. The following description will be limited to the example of a fixed-image or moving-image projector in which the images are generated in a component comprising liquid crystals of the nematic type. It is known that such liquid crystals must be illuminated by light linearly polarized in a defined direction with respect to the axes of the liquid crystal.

In order to produce this linearly polarized light, an unpolarized light source is used together with a polarizing beam splitter which delivers, in a first direction, polarized light suitable for illuminating the liquid-crystal component and, in a perpendicular direction, light having the crossed polarization, i.e. light whose polarization vector is rotated through 90° with respect to the light in the first direction. In order for all, or most, of the energy delivered by the light source to be used to illuminate the liquid-crystal component, use is often made of a polarization-rotating device which rotates the polarization of the light received through 90° into the crossed polarization.

There are two known ways of rotating the polarization through 90°.

The first way consists in providing a plate called a quarter-wave plate, or $\lambda/4$, plate which converts the crossed linear polarization into a circular polarization in one direction and a mirror which reflects the circularly-polarized light. The reflected signal has a circular polarization in the other direction and, after it has passed through the quarter-wave plate, the linear polarization of this signal is perpendicular to the direction that it had on entering this quarter-wave plate. Thus, on leaving the quarter-wave plate, after reflection off the mirror, the light has the linear polarization of suitable direction. Such a device, in which the incoming and outgoing beams have the same direction, is relatively compact; this is why it is widely used. However, it has the drawback of operating correctly only for a single wavelength and for a defined direction.

The second known way consists in providing an arrangement of two mirrors forming the faces of a total-reflection prism, the light striking these faces at an angle of incidence of 45°. The orientation and the arrangement of these mirrors are such that the polarization is in the same direction after reflection off one of the mirrors and is in the perpendicular direction after reflection off the other mirror. Such a polarization-rotating device is almost wavelength-insensitive. However, it is annoyingly bulky. In addition, given that the outgoing beam of this device is perpendicular to the incoming beam, it does not fit well into the usual applications which require the incoming beam and the outgoing beam to be in the same direction.

SUMMARY OF THE INVENTION

The invention provides a polarization-rotating device which has the advantages of the two approaches known hitherto, but without their drawbacks. The device according to the invention is therefore wavelength-insensitive, is not very bulky, and the output beam is in the same direction as the input beam.

This device, in which the output beam is in the same direction as the input beam, is characterized in that it comprises at least one combination of three mirrors, the light being reflected off them each time at an angle of 45°, and in that the incident beam and the mirrors are arranged in such a way that two mirrors preserve the direction of polarization and the third rotates this polarization through 90°.

In the preferred embodiment of the invention, a plurality of three-mirror combinations is provided, each combination forming a regularly repeated pattern and the patterns all having identical shapes and sizes. It is particularly advantageous for these patterns to form reliefs on one face of a sheet of transparent material. In this case, the polarization-rotating device may be produced by moulding, for example by moulding a transparent plastic such as an acrylic material.

It will be noted that since the transparent materials normally used have a refractive index generally between 1.4 and 1.7, the total reflection occurs at and beyond an angle of incidence of approximately 40°. Under these conditions, incidence at 45° corresponds to total reflection, i.e. without loss.

Preferably, the patterns are contiguous and, in projection on a plane perpendicular to the incident rays, these patterns entirely fill a surface without any discontinuity (interruption).

BRIEF DESCRIPTION OF THE DRAWINGS

Other features and advantages of the invention will emerge from the description of some of its embodiments, the description being given with reference to the drawings appended hereto, in which.

DETAILED DESCRIPTION OF PREFERRED EMBODIMENTS

Figure 1:
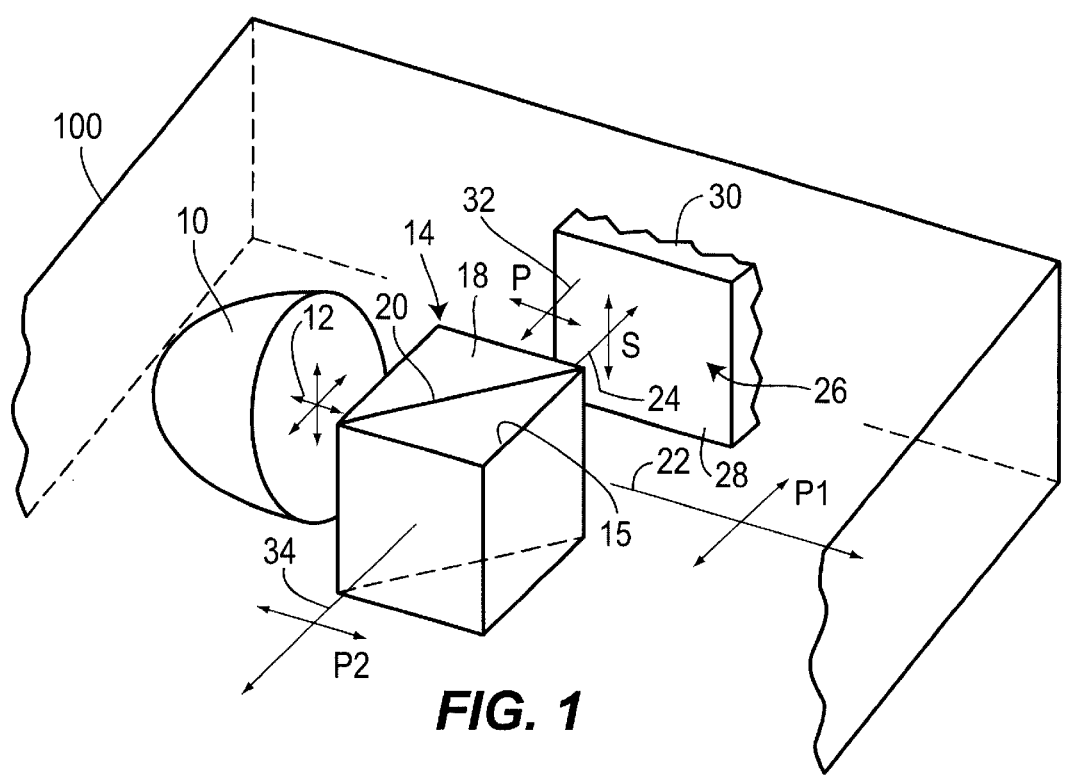
FIG. 1 is a perspective diagram of part of a projector comprising a polarization-rotating sheet according to the invention.

FIG. 1 shows part of a liquid-crystal projection apparatus 100, sometimes called an "LCD projector". This projector comprises a light source 10 producing an unpolarized light beam 12. This beam 12 is directed onto a polarizing beam splitter 14 which, in the example, is in the form of two prisms 15 and 18 having a common face 20 which splits the beams into different polarizations. This face 20 is oriented at 45° with respect to the incident beam 12.

The beam 12 striking this face 20 is split, on the one hand, into a linearly polarized transmitted beam 22 with a vector $P_1$ which, in the example, is horizontal and corresponds to the desired polarization and, on the other hand, into a beam 24 reflected by the face 20, and therefore perpendicular to the incident beam 12, the polarization vector S of which is vertical, i.e. perpendicular to the vector $P_1$.

The beam 24, perpendicular to the beam 22, is directed onto the sheet 26 of transparent material forming the polarization-rotating device according to the invention. The beam 24 enters the sheet 26 perpendicular to its entrance face 28. The beam 24 is reflected off the reliefs on the face 30 opposite the face 28 in such a way that it emerges from the face 28 as a beam 32, which is in the same direction but has a polarization P perpendicular to the polarization S, i.e. a horizontal polarization. The beam 32 passes back through the splitter 14 and emerges therefrom, as a beam 34, having preserved the horizontal polarization $P_2$, like the polarization $P_1$ of the beam 22.

These beams 22 and 34 are directed, by means comprising a mirror (or mirrors) (not depicted), onto an image-forming liquid-crystal component (not shown).

Figure 2:
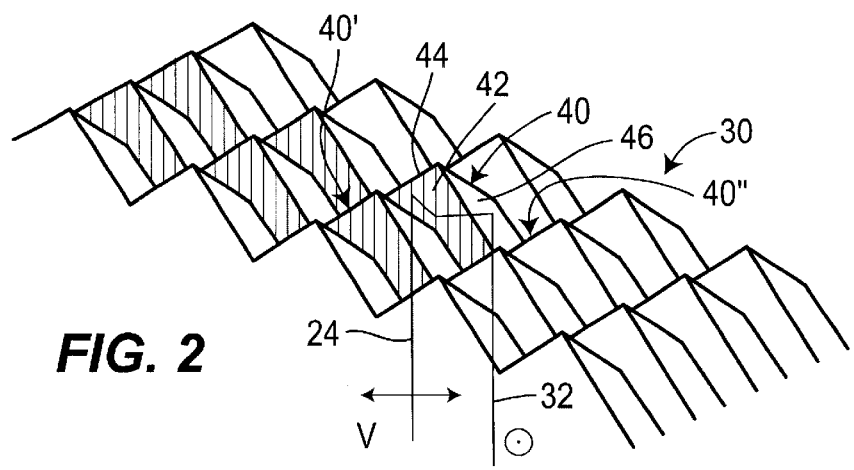
FIG. 2 is a diagram showing, in perspective, the relief on the sheet according to the invention.

The sheet 26 of the invention is made of a transparent plastic. It has reliefs shown in perspective in FIG. 2. These reliefs constitute a regular grating formed by the repetition of a pattern 40.

Figure 3:
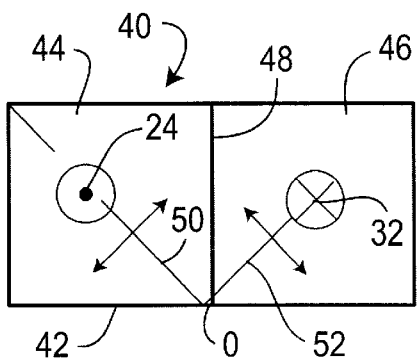
FIG. 3 is a top view, on a larger scale, of the pattern on the sheet shown in FIG. 2.
Figure 4:
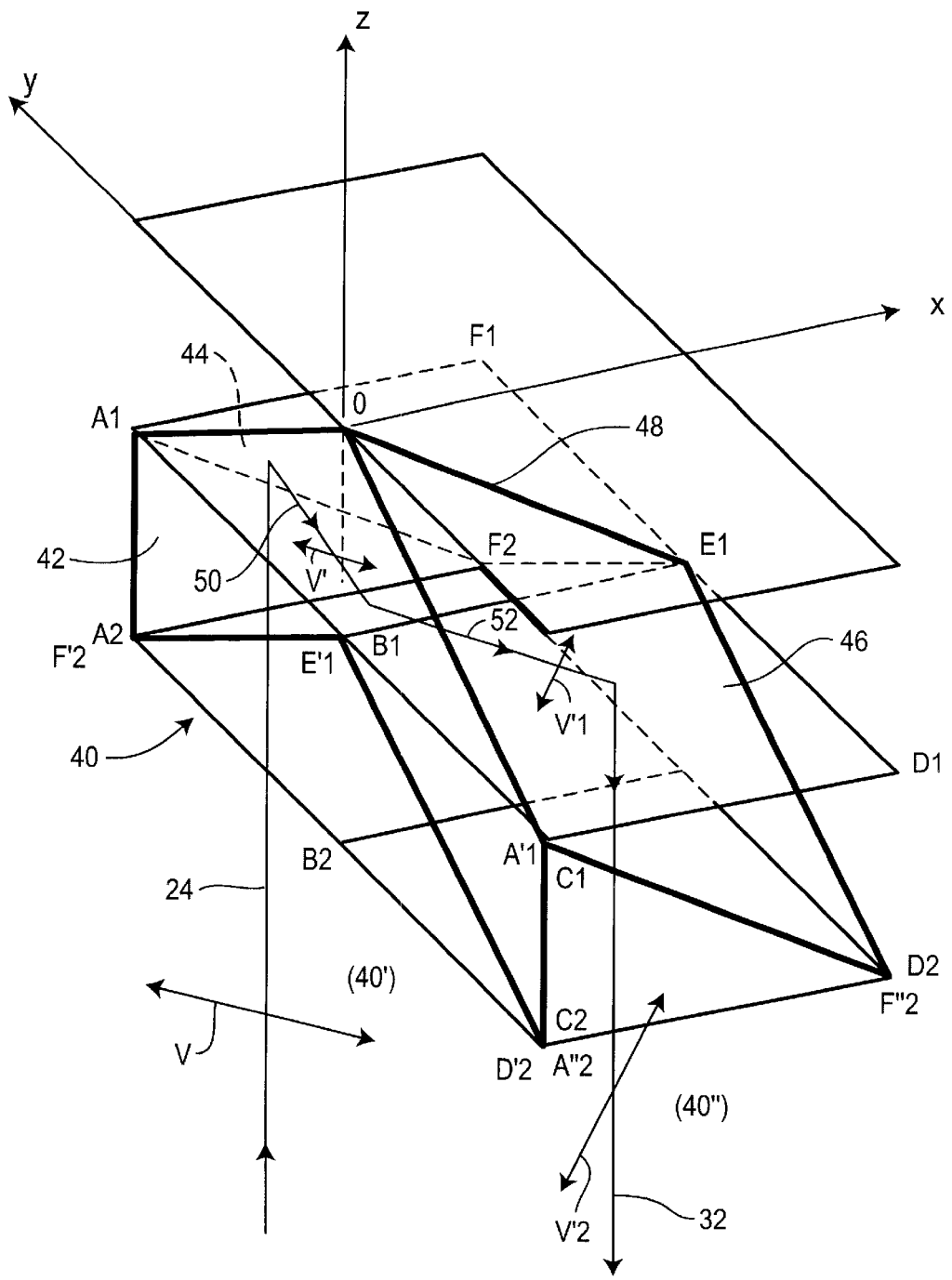
FIG. 4 is a perspective diagram, in a coordinate system consisting of three rectangular axes, of the pattern on the sheet according to the invention, this diagram also showing light rays and their polarization vectors.

An elementary pattern 40 is shown in top view in FIG. 3 and in perspective in FIG. 4. The patterns are derived from one another by translations along vectors parallel to the plane of the entrance face 28.

Such a pattern 40 is formed by three faces 42, 44, 46, each constituting a mirror.

The first face 42 is perpendicular to the plane of the entrance face 28. Some of the faces 42 have been shown with cross-hatching in FIG. 2, with respect to which it should be pointed out that all the faces 42 are either in the same plane or parallel to one another.

The second face 44 is inclined at 45°, on the one hand, to the face 42 and, on the other hand, to the entrance face 28 of the sheet 26.

Likewise, the third face 46 of each pattern 40 is inclined at 45°, on the one hand, to the face 42 and, on the other hand, to the face 28. It has a common edge 48 with the face 44. The faces 44 and 46 are symmetrical with respect to the plane defined by the common edge 48 and the direction perpendicular to the face 28.

The geometry of the pattern 40 will now be described in detail with reference to FIG. 4.

In order to define the shape and dimensions of the pattern, a trirectangular trihedron has been drawn with an x-coordinate axis Ox, a y-coordinate axis Oy and a z-coordinate axis Oz. The origin O of this trihedron lies at the point common to the edge 48 and to the face 42.

The plane defined by the Ox and oy axes is parallel to the face 28.

The face 42 has the general shape of an upside-down V with two end edges $A_1$–$A_2$ and $C_1$–$C_2$ of equal length, with the same z-coordinates and parallel to the Oz axis.

The coordinates of the vertices $A_1$, O, $C_1$, $C_2$, $B_1$ and $A_1$ of this face 42 are as follows:

$$O\begin{pmatrix}0\\0\\0\end{pmatrix};\ A_1\begin{pmatrix}0\\a\\-\frac{a\sqrt{2}}{2}\end{pmatrix};\ A_2\begin{pmatrix}0\\a\\-a\sqrt{2}\end{pmatrix};\ B_1\begin{pmatrix}0\\0\\-\frac{a\sqrt{2}}{2}\end{pmatrix};$$

$$C_2\begin{pmatrix}0\\-a\\-a\sqrt{2}\end{pmatrix};\ C_1\begin{pmatrix}0\\-a\\-\frac{a\sqrt{2}}{2}\end{pmatrix}$$

Conventionally, in each column associated with each point, the first value represents the x-coordinate, the second value represents the y-coordinate and the third value represents the z-coordinate.

a is a length which, in the example, has a value of approximately 1 mm or less.

It should be pointed out that the notation for the vertices is such that the index 1 corresponds to the z-coordinate $$-\frac{a\sqrt{2}}{2}$$

and the index 2 to the z-coordinate $-a\sqrt{2}$.

The face 44 has the general shape of a rhombus, the vertices of which are $A_1$, O, $E_1$ and $F_2$. The coordinates of the vertices $E_1$ and $F_2$ are as follows:

$$E_1\begin{pmatrix}a\\0\\-\frac{a\sqrt{2}}{2}\end{pmatrix};\ F_2\begin{pmatrix}a\\a\\-a\sqrt{2}\end{pmatrix}.$$

Finally, the third face 46 is identical to the face 44, that is to say it has the shape of a rhombus O, $C_1$, $D_2$, $E_1$. The coordinates of the vertex $D_2$ are:

$$D_2\begin{pmatrix}a\\-a\\-a\sqrt{2}\end{pmatrix}.$$

An adjacent pattern 40', which is derived from the pattern 40 by a translation along the Ox axis, is joined to the pattern 40 in such a way that this pattern 40' has its vertices $F'_2$, $E'_1$ and $D'_2$ coincident with the vertices $A_2$, $B_1$ and $C_2$, respectively.

The adjacent pattern 40", which is derived from the pattern 40 by a translation along the direction of the y-axis Oy, has vertices $A''_2$, $A''_1$ and $F''_2$ coincident with the vertices $C_2$, $C_1$ and $D_2$ of the pattern 40, respectively. Thus all the patterns are joined together without any discontinuity, i.e. without any interruption, and they all have the same height. The face 30 is in the form of a face with reliefs of total depth $a\sqrt{2}$.

It may be seen that, in projection on the Oxy plane, parallel to the Oz axis, the patterns fill the surface entirely, with no empty spaces.

The thickness of the sheet 26 is at least $a\sqrt{2}$. In one example, this thickness is about 2 to 3 mm.

The orientation of the sheet 26 with respect to the polarizing beam splitter 14 must be chosen in such a way that an incoming ray has its polarization vector parallel to the direction $E_1C_1$ or parallel to the direction $A_1E_1$, i.e. at 45° with respect to the Ox and Oy axes and, in any case, parallel to the plane defined by these Ox and Oy axes and therefore parallel to the entrance face 28.

We consider firstly an incident ray 24 in a direction parallel to the Oz axis and with a polarization V parallel to $A_1E_1$, this ray being firstly reflected by the face 44.

The reflected ray 50 has a polarization vector V' which is also parallel to $A_1E_1$. This ray 50 is reflected off the first face 42 perpendicular to the entrance face. The ray 52 which results therefrom has a polarization vector $V'_1$ which is rotated through 90°, i.e. parallel to $E_1C_1$.

The ray 52 is reflected off the face 46, likewise at an angle of 45°. The outgoing ray 32 is parallel to the incoming ray 24, i.e. parallel to the Oz axis, and its polarization vector $V'_2$ is still parallel to $E_1C_1$, i.e. perpendicular to the polarization vector V of the incident beam 24.

It may be easily understood that a ray incident on the face 46 in the Oz direction and with a polarization parallel to $E_1C_1$ exits with a perpendicular polarization.

An incoming ray 24 with a polarization parallel to $E_1C_1$ and firstly reflected by the face 44 is returned in such a way that the reflected ray 50 has a polarization of perpendicular direction, i.e. parallel to $A_1E_1$. The subsequent reflections off the faces 42 and 46 no longer change the orientation of the polarization vector, which thus emerges with a direction parallel to $A_1E_1$.

The situation is summarized as follows: the rays enter the sheet 26 in a direction perpendicular to the face 28 with a polarization vector at 45° with respect to the Ox and Oy axes; each incident ray is firstly reflected by the total-reflection mirror 44 or 46 at an angle of 45°; the mirror 42, also a total-reflection mirror, receives the ray coming from the mirror 44 or 46 and also reflects it; the angle of incidence is also 45° and the incident and reflected rays are in a plane parallel to the xOy plane; the ray reflected by the mirror 42 undergoes a final reflection, at an angle of 45°, off the mirror 46 or 44. The polarization vector undergoes a direction change on only one of the three mirrors.

Although in the embodiment described above the polarizing beam splitter consists of a two-prism combination, it goes without saying that any other polarizing beam splitter may be suitable, for example a glass/air plate operating with an angle of incidence below the Brewster angle or a polarizing beam-splitter film such as that sold under the name DBEF (Dual Brightness Enhancement Film) by the company 3M.

What is claimed is:

1. A multimirror device receiving an electromagnetic signal including a light ray having a given polarization, said multimirror device comprising:

at least a pattern formed by at least one combination of three mirrors forming a polyhedron; with an entrance face, a first mirror face being perpendicular to the entrance face and second and third mirror faces inclined at 45 degrees to the first mirror face and to the entrance face, the second and third mirror faces being symmetrical with respect to a plane defined by a common edge to said second and third mirror faces; and the three mirror faces being arranged to receive an input ray of a given polarization and to rotate an input ray in order to output an output ray in parallel with the input ray with a polarization rotated through 90 degrees.

2. Device according to claim 1, wherein the pattern is regularly repeated, all patterns, having identical shapes and sizes.

3. Device according to claim 2, wherein in a projection parallel to said input ray on a plane perpendicular to said input ray, the patterns are contiguous and entirely fill a defined surface without any discontinuity.

4. Device according to claim 2, wherein the patterns form reliefs on one face of a sheet of transparent material, the refractive index of the material of said sheet being such that 45° reflections inside said sheet correspond to total reflections.

5. Device according to claim 4, wherein said sheet has an entrance face via which said input ray enters and said output ray leaves perpendicularly to said entrance face, and each said pattern comprises a face perpendicular to the entrance face.

6. Device according to claim 5, wherein said patterns all have the same height with respect to the entrance face.

7. Device according to claim 5, wherein a second one of the three mirror faces and third one of the three mirror faces of each pattern are symmetrical with respect to a plane containing their common edge and the direction perpendicular to the entrance face.

8. Device according to claim 5, wherein, in a trirectangular coordinate system Oxyz for which the plane of the x-coordinates and y-coordinates is parallel to the entrance face and the origin corresponds to the vertex of the pattern furthest away from the entrance face, the vertices $O, A_1, A_2, B_1, C_2, C_1, F_2, E_1$ and $D_2$ of the patterns have the following coordinates:

$$O\begin{pmatrix} 0 \\ 0 \\ 0 \end{pmatrix}; A_1\begin{pmatrix} 0 \\ a \\ -\frac{a\sqrt{2}}{2} \end{pmatrix}; A_2\begin{pmatrix} 0 \\ a \\ -a\sqrt{2} \end{pmatrix}; B_1\begin{pmatrix} 0 \\ 0 \\ -\frac{a\sqrt{2}}{2} \end{pmatrix};$$

$$C_2\begin{pmatrix} 0 \\ -a \\ -a\sqrt{2} \end{pmatrix}; C_1\begin{pmatrix} 0 \\ -a \\ -\frac{a\sqrt{2}}{2} \end{pmatrix}; D_2\begin{pmatrix} a \\ -a \\ -a\sqrt{2} \end{pmatrix};$$

$$E_1\begin{pmatrix} a \\ 0 \\ -\frac{a\sqrt{2}}{2} \end{pmatrix}; F_2\begin{pmatrix} a \\ a \\ -a\sqrt{2} \end{pmatrix};$$

a being a constant length.

9. Device according to claim 4, wherein the sheet is made by molding.

10. Device according to claim 4, wherein the material of the sheet contains a plastic.

11. Apparatus employing the device according to claim 1, further comprising a polarizing beam splitter delivering a first radiation beam with a linear polarization in a defined direction, and a second radiation beam with a polarization perpendicular to that of said first radiation beam applied to said device so that the polarization of an outgoing radiation is in the same plane as the polarization of the first radiation beam.

12. A projection apparatus having the device according to claim 1.

* * * * *